United States Patent [19]

Amore

[11] Patent Number: 5,608,414

[45] Date of Patent: Mar. 4, 1997

[54] HEAT REJECTING SPACECRAFT ARRAY ANTENNA

[75] Inventor: Leo J. Amore, Phoenixville, Pa.

[73] Assignee: Martin Marietta Corp., East Windsor, N.J.

[21] Appl. No.: 502,740

[22] Filed: Jun. 30, 1995

[51] Int. Cl.$^6$ .......................... H01Q 1/38; H01Q 13/10
[52] U.S. Cl. .................. 343/700 MS; 343/770; 343/872; 343/DIG. 2
[58] Field of Search .................. 343/700 MS, 767, 343/770, 705, 872, 725, 720, DIG. 2; 428/266

[56] References Cited

U.S. PATENT DOCUMENTS

| | | | |
|---|---|---|---|
| 4,479,131 | 10/1984 | Rogers et al. | 343/872 |
| 4,977,406 | 12/1990 | Tsukamoto et al. | 343/700 MS |
| 4,987,425 | 1/1991 | Zahn et al. | 343/853 |
| 5,215,824 | 6/1993 | Munro et al. | 428/473.5 |
| 5,270,721 | 12/1993 | Tsukamoto et al. | 343/700 MS |
| 5,273,815 | 12/1993 | Brydon et al. | 343/DIG. 2 |
| 5,283,592 | 2/1994 | Bogorad et al. | 343/872 |
| 5,293,171 | 3/1994 | Cherrette | 343/700 |
| 5,321,411 | 6/1994 | Tsukamoto et al. | 343/700 MS |
| 5,327,150 | 7/1994 | Cherrette | 343/771 |
| 5,373,305 | 12/1994 | Lepore, Jr. et al. | 363/DIG. 2 |

Primary Examiner—Donald T. Hajec
Assistant Examiner—Tan Ho
Attorney, Agent, or Firm—W. H. Meise; C. A. Berard; S. A. Young

[57] ABSTRACT

An antenna array for use in space includes an optical solar reflector (OSR)-like structure (310, 510), with sheet of transparent dielectric material (320, 520) and a metallic mirror (322, 522) formed on the sheet. In order to allow the individual antenna elements to radiate electromagnetic energy, the metallic mirror contains apertures (330, 530) which, in one embodiment, define the antenna elements, and which, in another embodiment, are registered with the antenna elements of the array. Where the mirror exists, insolation is reflected, and the heat gain from insolation is minimized. At the locations of the apertures in the mirror, insolation passes through the OSR-like structure, which may tend to increase the temperature of the structure. According to the invention, the apertures are covered with a thin layer (370, 570) of semiconductor material such as germanium or silicon, which does not affect the electromagnetic energy flow. The semiconductor tends to reflect visible light, thereby restoring a substantial amount of the function of the OSR. The semiconductor also emits heat energy, which allows heat to radiate from the apertures to aid in controlling temperatures.

11 Claims, 6 Drawing Sheets

HEAT REJECTING SPACECRAFT ARRAY ANTENNA

FIELD OF THE INVENTION

This invention relates to antennas for spacecraft, and more particularly to lightweight array antennas which reflect solar radiation and radiate internally generated heat.

BACKGROUND OF THE INVENTION

Spacecraft thermal control often involves the use of reflective blankets to reduce heat gain from solar insolation. However, such blankets tend to adversely affect the operation of antennas. U.S. Pat. No. 4,479,131, issued Oct. 23, 1984 in the name of Rogers et al., describes an RF-transparent thermal protective shield with a sheet of polyimide having an outer layer of germanium, and an inner layer consisting of a grid pattern of aluminization. Germanium is transparent to IR and reflects visible light. U.S. Pat. No. 5,215,824, issued Jun. 1, 1993 in the name of Munro et al., describes a multilayer RF-transparent thermal control covering for a spacecraft, in which the principal reflecting layer is a layer of white paint, which is protected from degradation due to charged particles by a transparent outer layer. U.S. Pat. No. 5,283,592, issued Feb. 1, 1994 in the name of Bogorad et al. describes a single-layer RF-transparent sunshield membrane in which white paint is the reflecting element. All of these patents describe membranes or blankets which are applied over a single antenna or its reflector. An antenna array, however, includes a plurality of antenna elements. An improved thermal control arrangement is desired for use with lightweight antenna arrays.

SUMMARY OF THE INVENTION

An array antenna, which may find use on a spacecraft, includes a plurality of antenna elements, each of which transduces electromagnetic energy with space. For purposes of this invention, an antenna transduces energy when it receives electromagnetic energy from space, and couples it into a transmission line (or lead), or when it radiates into space energy received at its feed point from a source. The antenna array is prevented from absorbing solar insolation by a dielectric substrate having a space-facing side, and a second side. The substrate is transparent to both visible light and heat energy, and has a metallic mirror on the second side, for reflecting insolation. In order to allow the electromagnetic radiation to pass through the metallic mirror, the mirror has apertures or slots associated with the antenna elements, through which the electromagnetic energy being transduced may flow to and from the antenna elements, and from thence to a source or a load, as appropriate. The mirror apertures tend to admit insolation, which tends to heat the antenna array and its support structures. The support structures may support other electrical power consuming equipment, such as transmit-receive modules, associated with the array antenna. According to the invention, a layer of semiconductor material is applied over the dielectric material, at least at the locations of the apertures in the mirror. The semiconductor layer is transparent to heat energy, so that radiation of infrared energy or light can occur therethrough, allowing heat to be radiated through the apertures, and the semiconductor layer also tends to reflect visible light, which tends to reduce the amount of heat absorbed from the insolation. The semiconductor material may be germanium or silicon. The transparent substrate may be quartz or glass.

DESCRIPTION OF THE DRAWING

FIG. 5b is an assembled view of the arrangement of FIG. 5a, and FIG. 5c is an exploded cross-sectional view of a portion of the arrangement of FIG. 5a.

DESCRIPTION OF THE INVENTION

Figure 1:
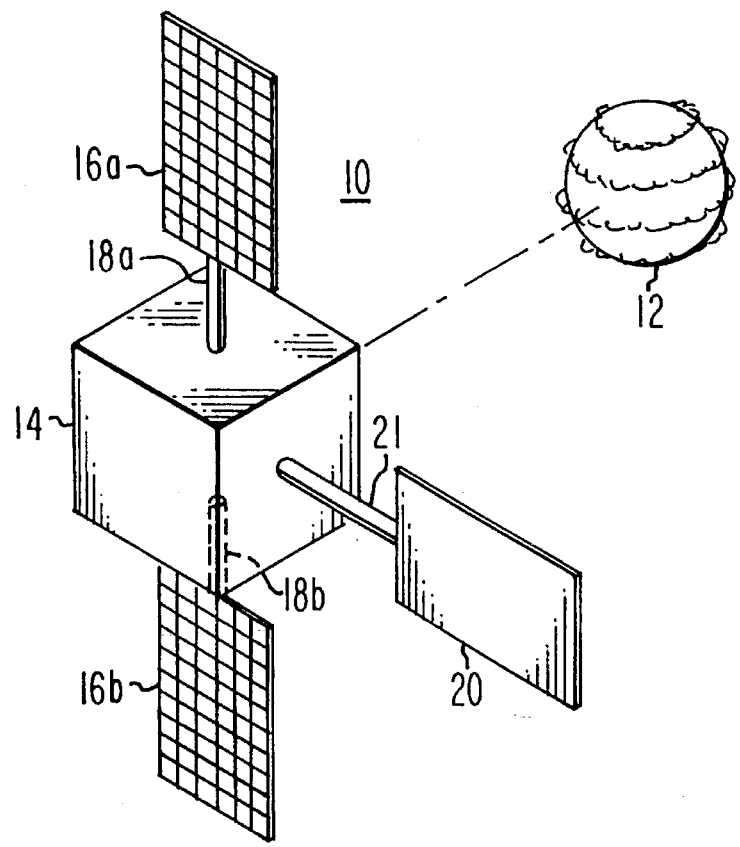
FIG. 1 is a simplified perspective or isometric view of a spacecraft orbiting a heavenly body.

FIG. 1 is a simplified perspective or isometric view of a spacecraft 10 orbiting a heavenly body 12. Spacecraft 10 includes a body 14, which supports first and second solar panels 16a and 16b by means of support members 18a and 18b, respectively. The solar panels generate electrical power for operating the electrical equipment of the spacecraft. Spacecraft 10 of FIG. 1 also supports a planar array antenna 20 by means of a support member 21. Array antenna 20 transmits signals to, and receives signals from, a location (not illustrated) associated with heavenly body 12, for communications or sensing purposes.

Figure 2:
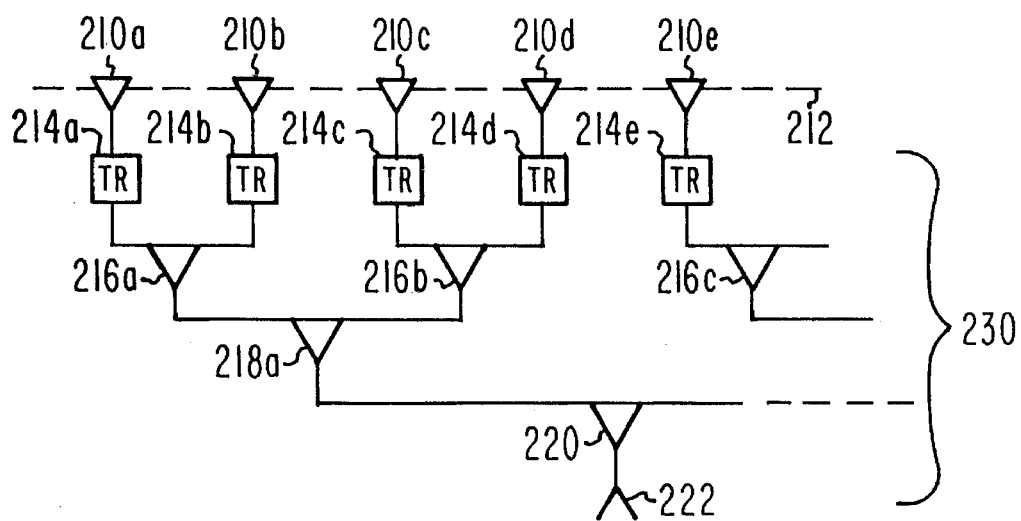
FIG. 2 is a simplified block diagram of an antenna array which may be used in conjunction with the spacecraft of FIG. 1.

FIG. 2 is a simplified block diagram of an antenna array 220 which may be used in conjunction with array antenna 20 of FIG. 1. In FIG. 2, elemental antennas 210a, 210b, 210c, 210d, 210e, . . . are illustrated as lying in a plane 212. The antenna elements are referred to jointly as antenna elements 210. Each antenna element 210 is associated with a transmit-receive (TR or T/R) module or block 214. More specifically, antenna element 210a is associated with a TR module 214a; antenna element 210b is associated with a TR module 214b; antenna element 210c is associated with a TR module 214c; antenna element 210d is associated with a TR module 214d; and antenna element 210e is associated with a TR module 214e. The TR modules, as known in the art, provide at least phase control of the radio-frequency (RF) signal applied to (in a transmitting context) or received from (in a receiving context) the associated antenna element, so that the net radiation pattern of the array antenna has the desired directional properties. The TR modules may also amplify the received signal with a low-noise amplifier, and amplify the signals to be transmitted with a power amplifier, and provide other known functions.

The TR modules of the arrangement of FIG. 2 couple the antenna elements to a beamformer designated generally as 230. As illustrated in FIG. 2, TR modules 214a and 214b are coupled to a power divider or power combiner 216a of beamformer 230, which splits the signals (transmitting mode) or sums the signals (receive mode). Similarly, TR modules 214c and 214d are coupled to a power divider or power combiner 216b, which splits or sums the signals. TR module 214e and another TR module, not illustrated, are connected to a divider/combiner 216c. Power divider/combiners 216a and 216b are coupled to a power divider/combiner 218a of another level of hierarchy, and power divider/combiner 216c is similarly coupled to other divider/combiners of other levels of hierarchy (not illustrated). The power divider/combiners of each level of hierarchy are coupled to higher levels, until a single power divider/combiner, illustrated in FIG. 2 as 220, provides a single port 222 by which the antenna array can be accessed with RF signal. Such tree-type beamformers are well known in the art for feeding the elements of an array antenna. Other types of beamformers may be used, if desired.

Figure 3A:
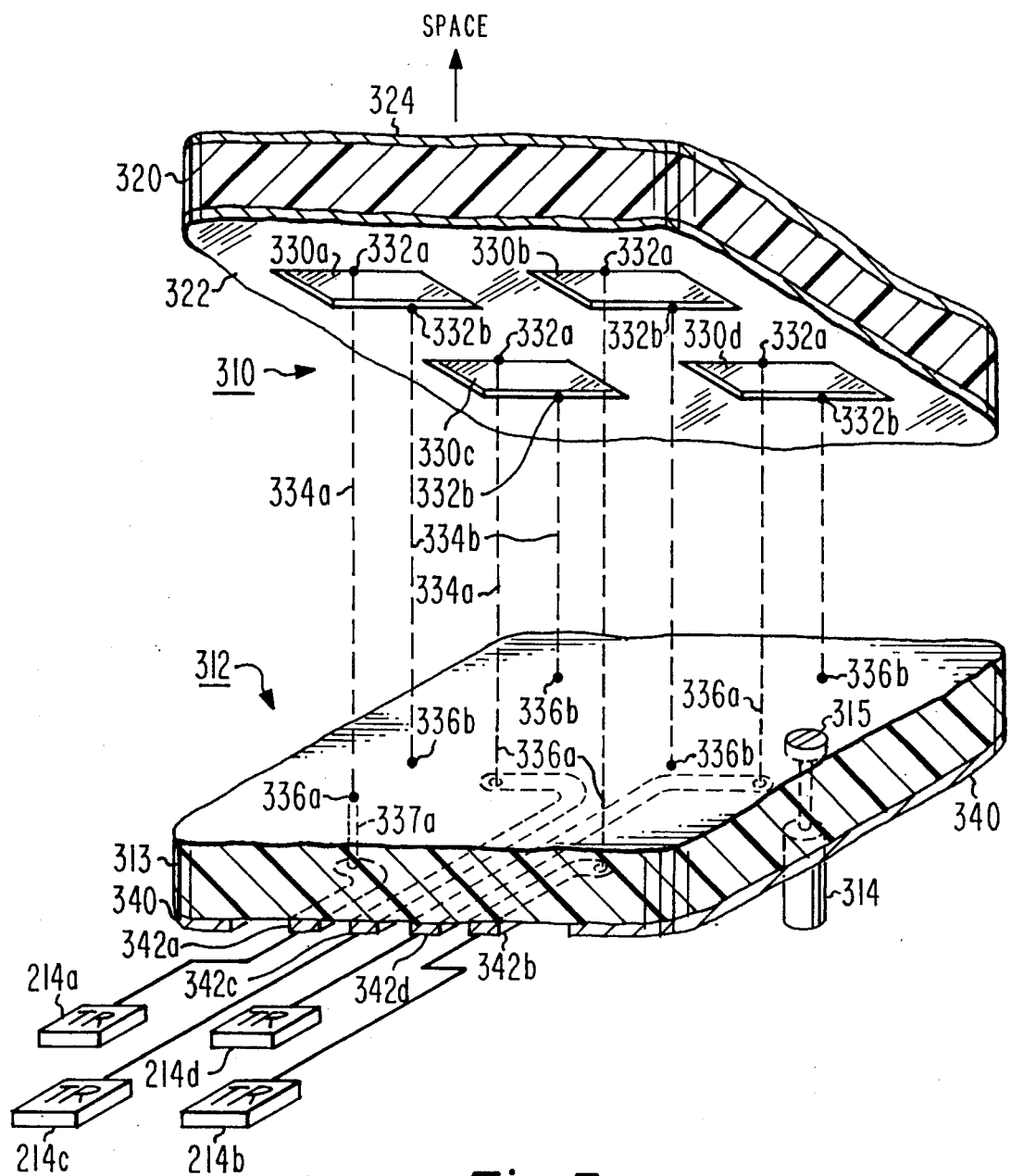
FIG. 3a is a simplified, exploded view of a portion of a slot array antenna according to the invention.
Figure 3B:
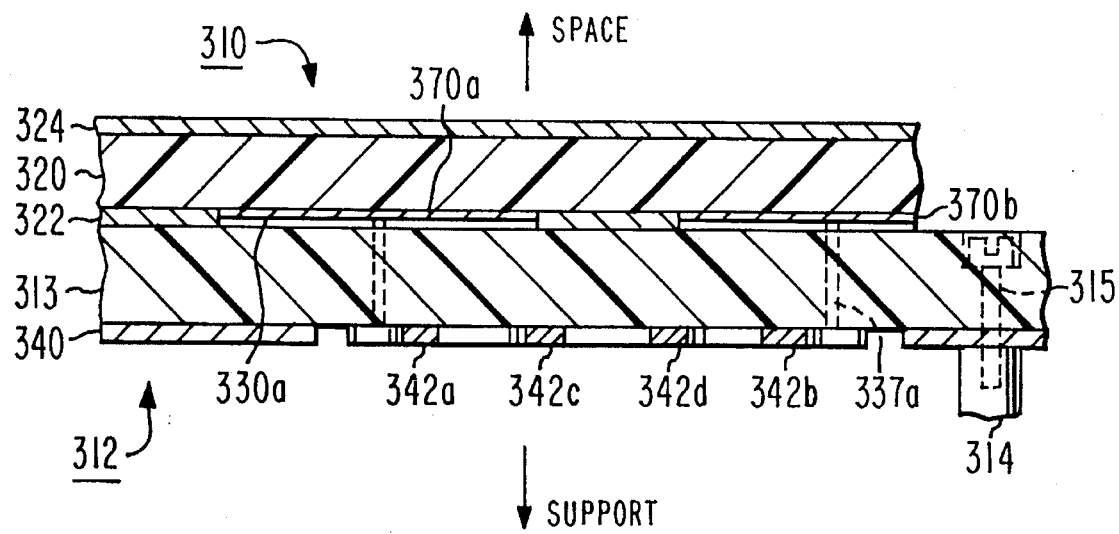
FIG. 3b is a cross-section thereof through elemental antennas.

FIG. 3a is a simplified, exploded view of a portion of an array antenna according to the invention, and FIG. 3b is a cross-section thereof through elemental antennas. In FIG. 3a, an optical solar reflector (OSR)-like structure 310 is illustrated as being exploded away from a printed-circuit feed board 312, which in turn is supported by a plurality of threaded support columns and screws, one set of which is illustrated as 314 and 315. OSR-like structure 310 includes a dielectric sheet 320 which is transparent to RF electromagnetic radiation or signals and to visible light. Dielectric sheet 320 has high emissivity to radiate infrared (IR) heat energy. Dielectric sheet 320 may be, for example, a quartz sheet. Dielectric sheet 320 has a first broad surface facing space, and has a second broad surface facing feed board 312. The side of dielectric sheet 320 facing feed board 312 is coated with a metallic mirror 322, which may be, for example, gold, silver or aluminum material, which, together with the dielectric sheet 320, forms a rear-surface reflector, which reflects back toward space any visible or infrared insolation. As known to those skilled in the art, it may be desirable to have a further electrically conductive surface of high resistivity, such as surface 324, facing into space, to equalize electrical charge distribution on the surfaces which may be exposed to a flux of charged particles. Such a high-resistivity electrically conductive surface may be achieved by a thin, transparent layer of indium-tin oxide (ITO), which is desirably connected at a location (not illustrated) to the spacecraft body.

According to an aspect of the invention, the elemental antennas of the antenna array are in the form of, or include, apertures or slots defined in metallic mirror layer 322. The separation between the elemental antennas of the array is determined by the desired characteristics of the array, and is selected in well-known manner. Thus, the spacing of the apertures of the arrangement of FIGS. 3a and 3b is established by antenna array considerations. As illustrated in FIGS. 3a and 3b, mirror layer 322 defines a plurality of rectangular apertures 330a, 330b, 330c, and 330d. Each aperture 330a, 330b, 330c, and 330d, is dimensioned so that its circumference or perimeter approximately equals a full wavelength λ at the desired frequency of RF radiation. Each elemental antenna aperture 330a, 330b, 330c, and 330d has a pair of feed points 332a, 332b, which are diametrically opposed to each other, centered on the longer side of the rectangular apertures. Such an arrangement places the feed points 180° apart electrically, and provides impedance control. When an RF signal is applied across the feed points 332a and 332b of any one elemental antenna aperture 330, that elemental antenna aperture will radiate. As described below, the presence of the ground plane associated with the printed-circuit feed board results in direction of the radiation toward space. Thus, the elemental antennas defined by apertures 330a, 330b, 330c, and 330d in FIG. 3a correspond with elemental antennas 210a, 210b, 210c, and 210d of the block diagram of FIG. 2.

Printed-circuit board 312 of FIGS. 3a and 3b provides connections between elemental antenna apertures 330a, 330b, 330c, and 330d and their respective TR modules, and may also interconnect the divider/couplers of the beamformer 230 of FIG. 2. Printed-circuit board 312 of FIGS. 3a and 3b includes a ground plane 340 on the side facing away from OSR-like structure 310. The ground plane 340 is cut away in a region around a plurality of strip conductors 342a, 342b, 342c, and 342d, which extend over the lower surface of printed-circuit board 312. These strip conductors coact with metallic mirror 322 to form a transmission line of the well-known "microstrip" variety, by which RF signals may be transmitted with low loss. More particularly, strip conductor 342a extends under printed-circuit board 312 to a location 336a, where a conductive via or through connection 337a, when OSR-like structure 310 is assembled with printed-circuit board 312, makes contact with feed point 332a of elemental antenna aperture 330a. Similarly, strip conductor 342b extends under printed-circuit board 312 to a location 336a, where a conductive via or through connection (not illustrated), when OSR-like structure 310 is assembled with printed-circuit board 312, makes contact with feed point 332a of elemental antenna aperture 330b. Strip conductors 342c and 342d extend under printed-circuit board 312 to other locations 336a, where other conductive vias (not illustrated), when OSR-like structure 310 is assembled with printed-circuit board 312, make contact with feed points 332c and 332d, respectively, of elemental antenna apertures 330c and 330d, respectively. The other feed points of the antenna apertures are connected by vias to ground plane 340 of printed-circuit board 312. More particularly, when OSR-like structure 310 is assembled with printed-circuit board 312, feed points 332b of each of elemental antenna apertures 330a, 330b, 330c, and 330d are connected by vias (not illustrated) at locations 336b of printed-circuit board 312 to ground plane 340.

Thus, the arrangement of FIGS. 3a and 3b as so far described feeds the elemental antenna apertures with an array of signals which have been appropriately phase-shifted to cause the array as a whole to radiate one or more beams in particular directions. The presence of ground plane 340 and of the other conductors on the bottom side of printed-circuit board 312 prevents radiation in directions other than toward space.

Printed-circuit board 312 of FIGS. 3a and 3b is supported, by a plurality of columns or standoffs similar to standoff 314, on other support structures of the spacecraft. Each standoff 314 receives a screw, one of which is illustrated as 315, the head of which is recessed into board 312 so as not to interfere with OSR-like structure 310.

The presence of apertures 330 in the reflective mirror layer 322 has the effect of allowing some of the solar radiation or insolation which falls on the array antenna to pass through, to be absorbed by interior structures. In the arrangement as illustrated in FIGS. 3a and 3b, insolation which arrives from space and passes through apertures 330 is absorbed by printed-circuit feed board 312. This insolation is undesirable, because it can raise the temperature of printed circuit board. The printed-circuit board can only lose heat in an upward direction by conducting the heat to OSR-like structure 310, and allowing the temperature rise of structure 310 to result in infrared radiation by the quartz substrate 320. Some heat may be extracted in the opposite direction, or downward, but the structure in that direction may be complex, because of the need to support TR modules and other electrical equipment, and to route signal and control cables. The problem of extracting heat from the interior of the antenna array is exacerbated when the TR modules and other equipment generate large amounts of heat, which may be the case when each TR module includes an RF power amplifier.

According to an aspect of the invention, the apertures 330a, 330b, . . . in the metallic mirror 322 of FIGS. 3a and 3b, which define the elemental antennas, are covered with a layer of a semiconductor material, such as silicon or germanium. The semiconductor material is intrinsic (undoped) or only lightly doped, so that it has high resistivity, and has little or no effect on RF radiation. The semiconductor material tends to reflect insolation, but is highly emissive to heat energy, so it tends to reflect the heat loading due to visible light, and allows radiation of heat energy due to the temperature of the interior structures of the array antenna, which in the illustrative example is the temperature of the printed-circuit feed board 312. The layer of semiconductor material associated with aperture 330a is illustrated in FIG. 3b as 370a, while the layer of semiconductor material associated with aperture 330b is illustrated as 370b. All of the apertures are so covered. The thickness of a layer of germanium in a preferred embodiment of the invention is 100 to 2000 angstroms (Å).

Figure 4A:
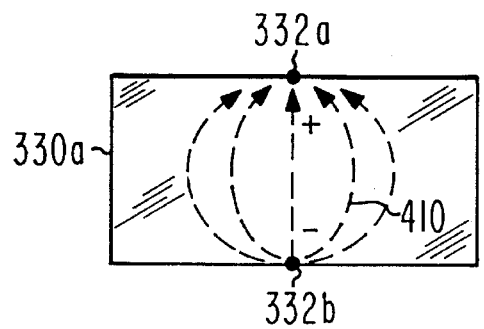
FIG. 4a is a plan view of a rectangular aperture of the arrangement of FIG. 3a, and FIG. 4b is a plan view of another shape of aperture which may be used.
Figure 4B:
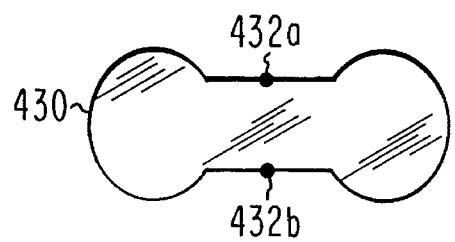

FIG. 4a is a plan view of aperture 330a of FIG. 3a and 3b, showing feed points 332a and 332b. The instantaneous electric field direction as a result of transducing of signal with space is illustrated by dash arrows 410. FIG. 4b illustrates a plan view of another aperture 430 which might be used, which has enlarged, circular end portions, to form a "dog-bone" shape. Many such shapes are known, and their perimeter lengths may deviate from one wavelength or λ.

Figure 5A:
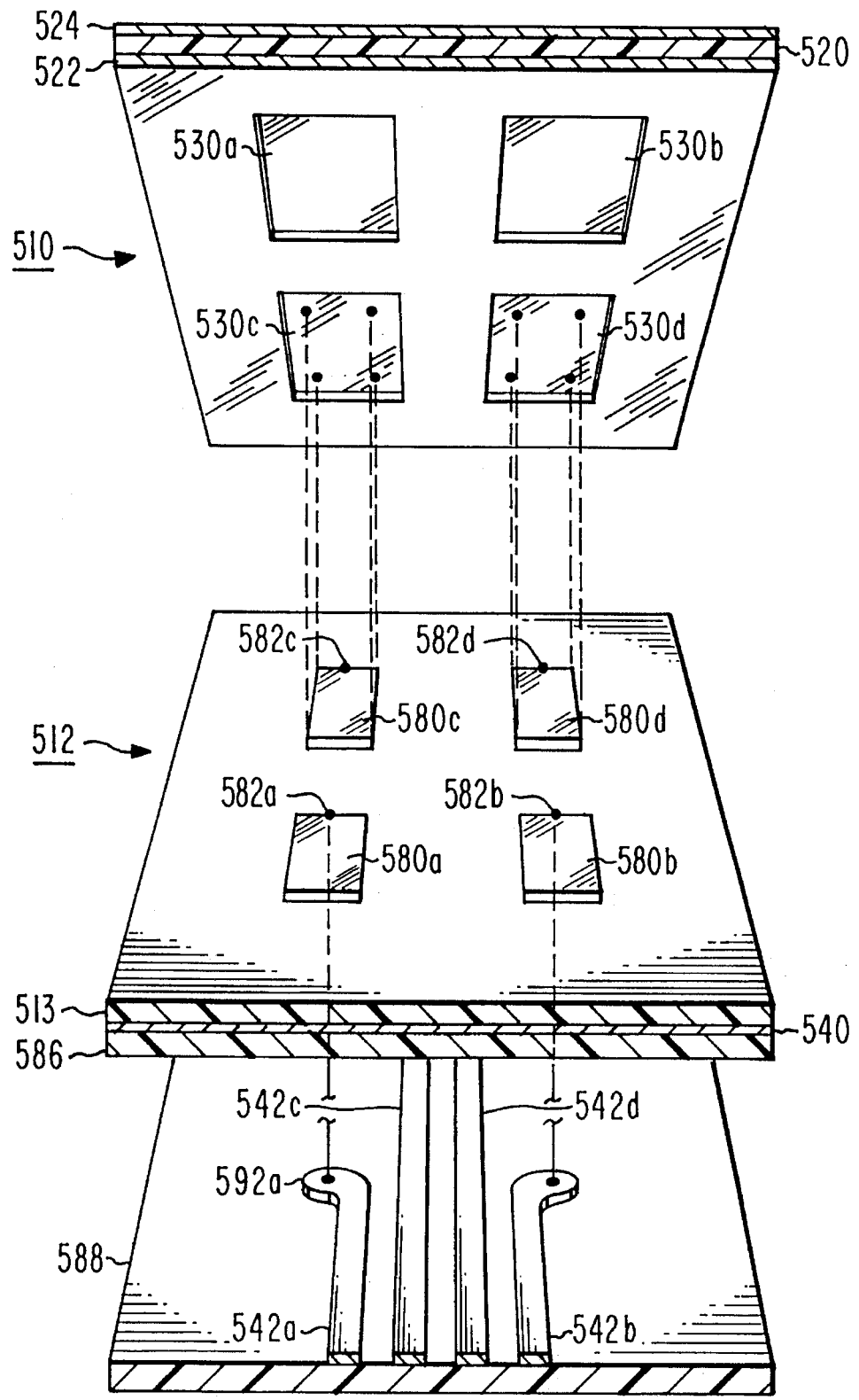
FIG. 5a is a simplified exploded perspective or isometric view of another array antenna according to the invention, which uses patch antennas.
Figure 5B:
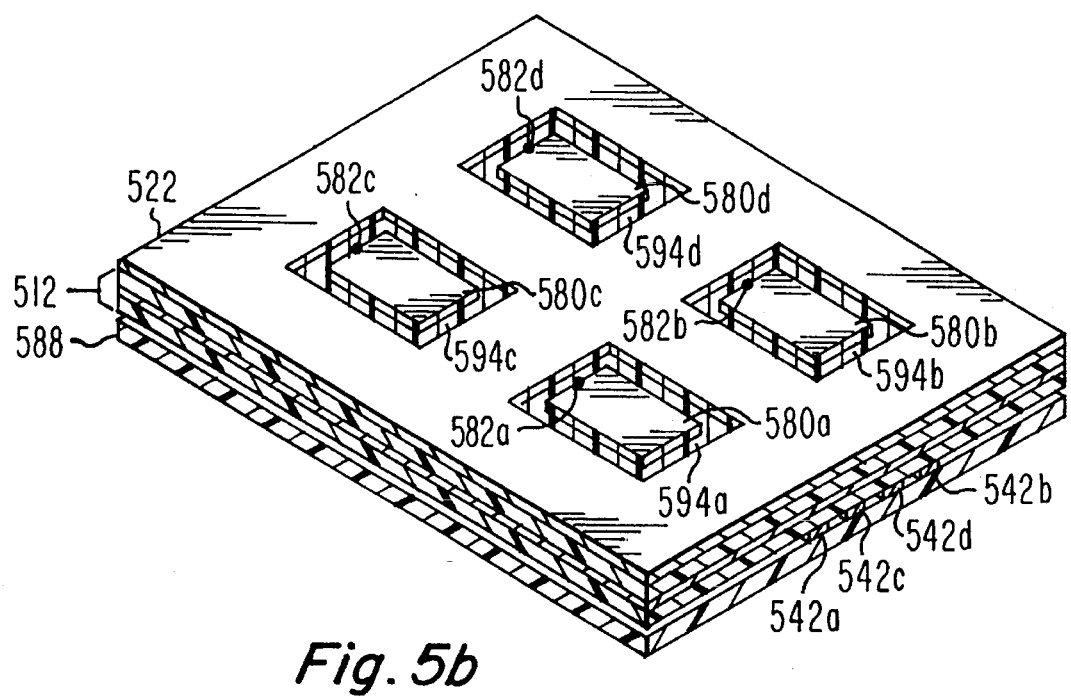
Figure 5C:
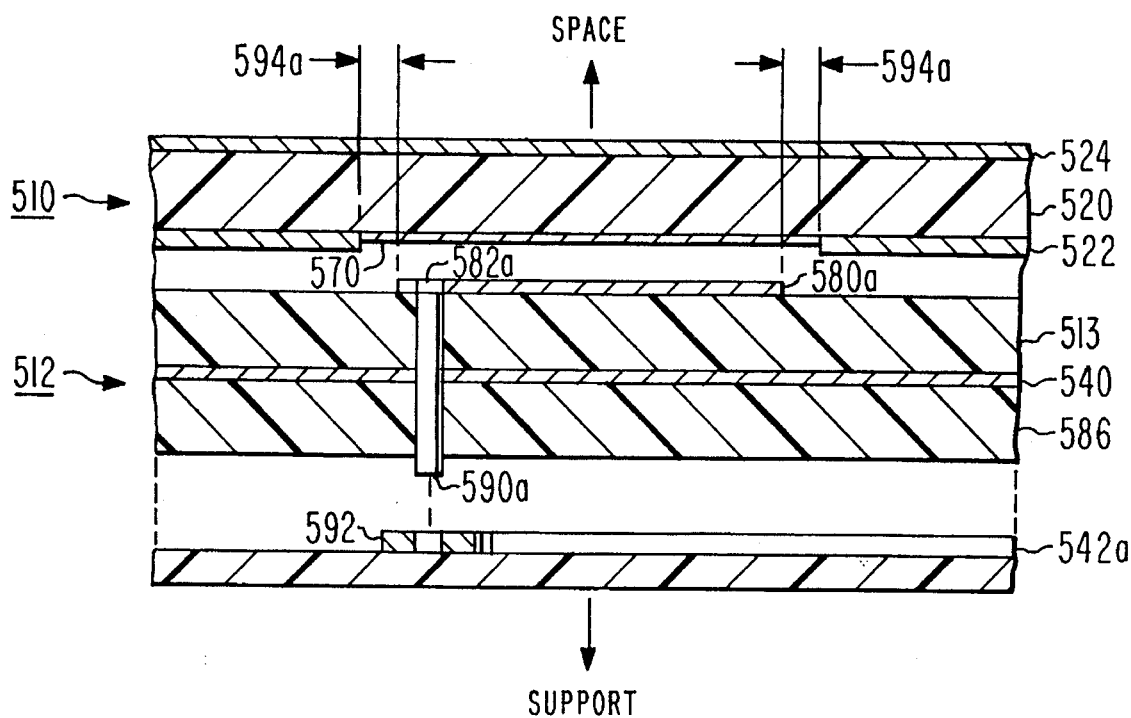

FIG. 5a is a simplified exploded perspective or isometric view of another array antenna according to the invention, FIG. 5b is an assembled view of the arrangement of FIG. 5a, and FIG. 5c is an exploded cross-sectional view of a portion of the arrangement of FIG. 5a. The arrangement of FIGS. 5a, 5b, and 5c includes "patch" antennas instead of slot antennas. In FIG. 5a, an OSR-like structure designated generally as 510 includes a dielectric sheet 520 and a metallic mirror 522 on its underside. The space-facing side of the OSR-like structure may optionally be covered with a slightly conductive film, such as ITO layer 524. A further printed circuit board designated generally as 512 has an upper dielectric sheet or body 513, a lower dielectric sheet or body 586, and an electrically conductive ground plane 540 interposed between sheets 513 and 586. Four electrically conductive patches 580a, 580b, 580c, and 580d are supported on the upper surface of dielectric body 513. Each of the patches is an elemental antenna of the antenna array. Electrically conductive patches 580 are made from deposited, light-reflective metal. Ideally, patches 580 reflect light as well as OSR mirror 520. Patch antennas are well known in the art, and differ from aperture or slot antennas chiefly in that they require only a single feed point, with the electric fields associated with the radiated field being generated between the patch and a nearby ground plane. In the arrangement of FIG. 5a, the ground plane is conductive sheet 540 sandwiched between dielectric sheets 513 and 586. The feed points for patch antennas 580a, 580b, 580c, and 580d are points 582a, 582b, 582c, and 582d, respectively. The capacitance of each patch 580 to ground 586 provides the path through which the RF antenna current flows to cause the desired RF radiation.

Feed points 582a, 582b, 582c, and 582d of patch antennas 580a, 580b, 580c, and 580d, respectively, are connected by conductive vias or wires, one of which is illustrated as 590a in FIG. 5c, to the terminal pads, one of which is designated 592a in FIGS. 5a and 5c, of transmission lines 542a, 542b, 542c, and 542d, respectively. In this regard, the arrangement of FIGS. 5a, 5b, and 5c is similar to that of FIGS. 3a and 3b.

In operation of the patch antenna array of FIGS. 5a, 5b, and 5c, RF signal to be transmitted is appropriately generated and phase-shifted if necessary, and applied over transmission lines 542a, 542b, 542c, and 542d to feed points 582a, 582b, 582c, and 582d of patch antennas 580a, 580b, 580c, and 580d, respectively. In response to the flow of RF current, the patch antennas 580a, 580b, 580c, and 580d radiate electromagnetic signals through the apertures 530a, 530b, 530c, and 530d, respectively. The presence of the electrically conductive mirror layer 522 of structure 510 affects the impedance of the patch antenna, and also affects the ability of the patch antenna to radiate. In general, the larger the apertures 530a, 530b, 530c, and 530d, the better the associated patch antenna will operate as a radiator of electromagnetic signal. As the aperture becomes smaller, the radiation resistance of the associated patch will be reduced, thereby reducing the antenna efficiency, or at least the instantaneous bandwidth. Thus, from the point of view of a patch antenna 580, the associated aperture 530 should be as large as possible. However, the requirement for reduced insolation mandates that as much of the space-facing surface as possible be covered by mirror layer 522 or by reflective patch layer 580. This dilemma is ameliorated by covering the gap between the patch antenna and the mirror with a semiconductor material, such as germanium or silicon, but which could be gallium arsenide or other semiconductor. The semiconductor is preferably intrinsic or only lightly doped, to keep its resistivity high, so as not to substantially affect the electromagnetic radiation which passes through the gap between the electrically conductive mirror portions (between mirror layer 522 and reflective patch layers 580a, 580b, etc.).

More specifically, referring to FIG. 5b, the hatched regions designated 594a, 594b, 594c, and 594d are those gaps or slots between the edges of mirror layer 522 at apertures 530a, 530b, 530c, and 530d and reflective patch antenna layers 580a, 580b, 580c, and 580d. Hatched regions 594a, 594b, 594c, and 594d are not reflective, and allow insolation to pass from the space-facing side of the structure to layer 512, where it may be absorbed, with the associated disadvantageous temperature rise. According to the invention, at least a portion of each aperture 530a, 530b, 530c, and 530d associated with a gap 594a, 594b, 594c, and 594d is covered with semiconductor. As illustrated in FIG. 5c, the entire aperture 530a is covered with semiconductor layer 570.

Figure 6A:
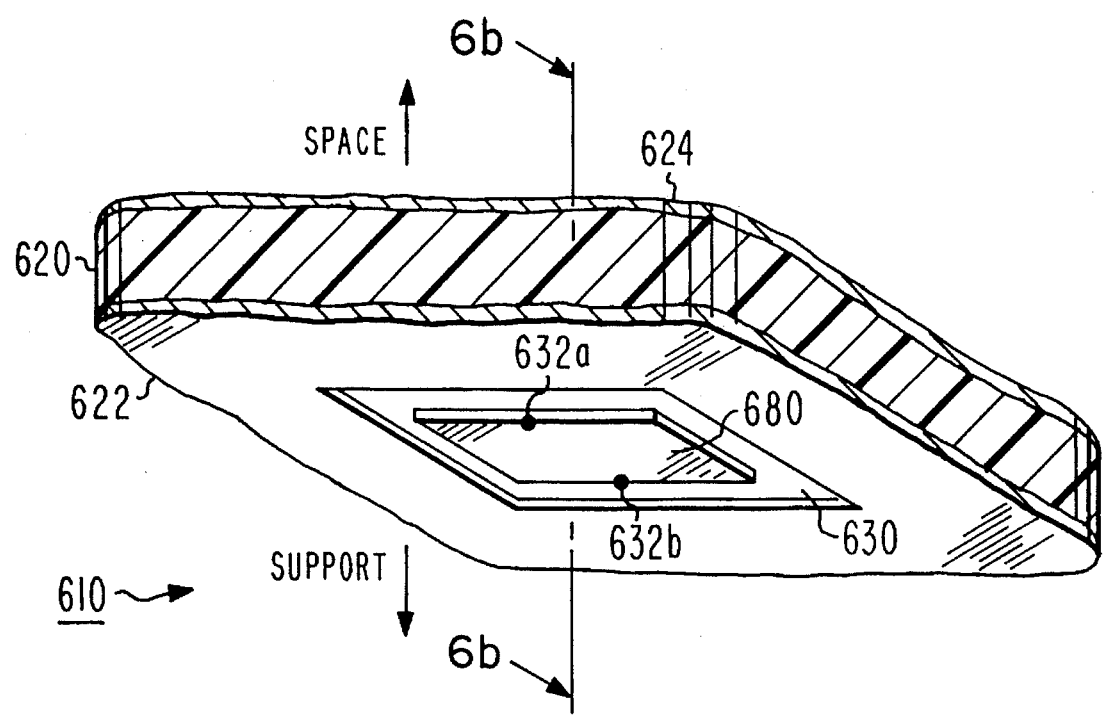
FIG. 6a is an arrangement similar to that of a portion of FIG. 3a, in which patch antennas are formed in the OSR-like structure.
Figure 6B:
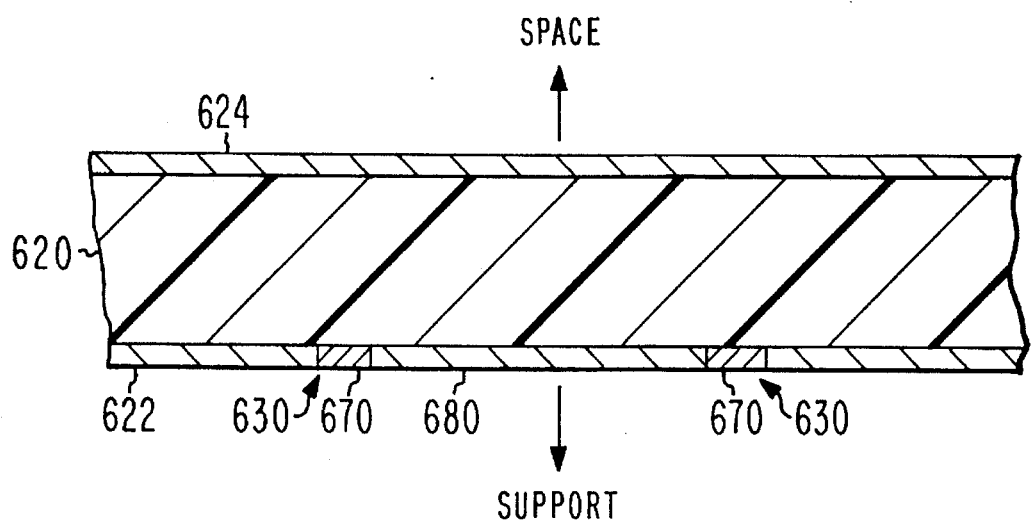
FIG. 6b is a cross-section thereof, illustrating a layer of semiconductor material in the gaps in the OSR-like structure.

FIG. 6a illustrates a simplified perspective or isometric view of a portion of an array antenna according to the invention. In FIG. 6a, an OSR-like structure 610 includes a dielectric sheet 620 which is transparent to RF and to visible light, such as the quartz mentioned above. The side of dielectric sheet 320 facing the support is coated with a metallic mirror surface 622, forming a rear-surface reflector. A further ITO layer 624 coats the space-facing side of sheet 620. The elemental antennas of the array (only one elemental antenna is illustrated in FIG. 6a) are patch antennas defined in mirror layer 622 by etching after the mirror 622 is deposited, or by masked deposition of the mirror material. The non-mirror gap is illustrated as a gap 630 having a rectangular form, which defines elemental patch antenna 680. The feed points of patch 680 are illustrated as 632a and 632b. FIG. 6b is a cross-section of the arrangement of FIG.

6a looking in the direction of arrows 6b—6b. In FIG. 6b, gaps 630 are seen to contain a layer of semiconductor material, for reflecting visible light over the gaps, and aiding in reducing insolation.

Other embodiments of the invention will be apparent to those skilled in the art. For example, while the invention has been described as being applicable to planar arrays, there is no particular reason to so limit it, and the invention may therefore be used with curved array antennas. While a single array antenna 20 is illustrated in FIG. 1, a spacecraft may have a plurality of array antennas. While a single array has been illustrated, which may be used for both transmission and reception, separate transmit and receive antennas may be used, and each may use a separate beamformer, thereby eliminating the need for T/R modules, and allowing the use of separate transmit or receive modules, as appropriate. While the patch antennas have been illustrated as having a single feed point, feed of patch antennas with plural terminals is well known.

What is claimed is:

1. An array antenna including a plurality of elemental antennas, for transducing electromagnetic fields, said array comprising;

a substantially planar dielectric substrate which is transparent to visible light and to infrared light, said substrate defining a first surface, and also defining a second surface parallel to said first surface;

an electrically conductive layer of light-reflecting mirror lying on said second surface of said dielectric substrate, said layer of mirror defining a pattern of a plurality of apertures exposing said substrate, which apertures define said elemental antennas, and across which the electric component of said electromagnetic fields may extend in the plane of said mirror;

a support structure mechanically coupled to said second surface of said dielectric substrate, for supporting said dielectric substrate and said mirror;

whereby insolation falling upon said array antenna and passing through said dielectric substrate tends to be reflected by said mirror layer in those regions about said apertures, but insolation falling upon said dielectric substrate at said apertures tends to pass through said apertures, and may be absorbed by said support structure, thereby undesirably tending to raise the temperature of said support structure and substrate; and a thin layer of semiconductor material covering said second surface of said substrate in the region of said apertures, and in contact with said second surface of said substrate, said layer of semiconductor material tending to reflect visible light components of said insolation, and to radiate infrared energy arising from heating of said support structure.

2. An antenna array according to claim 1, wherein said substrate material is quartz.

3. An antenna array according to claim 1, wherein said semiconductor material is germanium.

4. An antenna array according to claim 1, wherein said semiconductor material is silicon.

5. An antenna array according to claim 1, further comprising feed means coupled to said mirror layer adjacent at least some of said apertures, for transducing signals between each of said elemental antennas and at least one of a source and a load.

6. An antenna array according to claim 5, wherein said feed means is associated with at least some of said apertures, and comprises:

an electrically conducting cavity extending away from said first and second surfaces of said dielectric substrate; and cavity coupling means coupled to said cavity and to said at least one of said source and load.

7. An antenna array according to claim 1, further comprising:

a spacecraft body mechanically coupled to said substrate, whereby said substrate and said body are held in a particular physical relationship;

electrically energized means coupled to said array antenna, for amplifying signals related to said electromagnetic fields, and for converting at least some of said electrical power into heat; and electrical power generating means supported by said spacecraft body, for generating electrical power, and for coupling said electrical power to said power consuming means, whereby said electrical power consuming means amplifies said signals, and heats said support structure.

8. An array antenna, comprising:

a substantially planar printed circuit board defining a plurality of elemental antennas;

a plurality of feed means coupled to said printed circuit board, for transducing signals with said elemental antennas;

support means for supporting at least said printed circuit board;

optical solar reflection means mechanically located adjacent a first side of said printed circuit board, said optical solar reflection means comprising a substantially planar sheet of dielectric material, which is transparent to visible light, and to RF electromagnetic radiation, said optical solar reflection means also including a metallic mirror layer on a side of said sheet of dielectric material, for reflecting visible light, heat energy, and RF electromagnetic radiation, said metallic mirror defining apertures registered with said elemental antennas, to thereby allow electromagnetic radiation generated by said elemental antennas to flow through said aperture and said sheet of dielectric material and away from said array antenna, whereby said apertures in said metallic mirror allow insolation to heat said support means; and a layer of semiconductor material covering, and in contact with, said sheet of dielectric material at said apertures in said metallic mirror, to thereby tend to reflect insolation at said apertures to reduce insolation heating, and to allow heat energy from said printed circuit board and said support structure to pass through said apertures, to enhance radiant cooling.

9. An array antenna according to claim 8, wherein said sheet of dielectric material is a sheet of quartz.

10. An array antenna according to claim 8, wherein said semiconductor material is one of germanium and silicon.

11. An array antenna according to claim 8, wherein said support means is mechanically coupled to a spacecraft body, and said metallic mirror of said optical solar reflection means is on a side of said sheet of dielectric material which is remote from a second side of said sheet of dielectric material which faces space.

\* \* \* \* \*